United States Patent [19]

Tomita

[11] Patent Number: 4,488,438
[45] Date of Patent: Dec. 18, 1984

[54] SQUARE-WAVE CURRENT GENERATOR

[75] Inventor: Toyofumi Tomita, Tokyo, Japan

[73] Assignee: Tokyo Shibaura Denki Kabushiki Kaisha, Kawasaki, Japan

[21] Appl. No.: 481,945

[22] Filed: Apr. 4, 1983

[30] Foreign Application Priority Data

Apr. 19, 1982 [JP]  Japan .................. 57-65095

[51] Int. Cl.³ .............................. G01F 1/60
[52] U.S. Cl. .................. 73/861.12; 361/152
[58] Field of Search ........... 73/861.11, 861.12, 861.17, 73/861.16; 361/152, 153, 154

[56] References Cited

U.S. PATENT DOCUMENTS

| | | | |
|---|---|---|---|
| 3,351,822 | 11/1967 | Imahashi | 361/152 |
| 3,955,413 | 5/1976 | Steele et al. | 73/861.12 X |
| 4,144,751 | 3/1979 | Yokoyama | 361/154 X |
| 4,325,261 | 4/1982 | Freund, Jr. et al. | 73/861.12 |
| 4,373,400 | 2/1983 | Sekiguchi | 73/861.12 |
| 4,409,846 | 10/1983 | Ueno | 73/861.12 |

FOREIGN PATENT DOCUMENTS 107123  8/1981  Japan .................. 73/861.16

*Primary Examiner*—Charles A. Ruehl
*Attorney, Agent, or Firm*—Cushman, Darby & Cushman

[57] ABSTRACT

A square-wave current generator with a power supply section, control elements connected in series across the power supply section, an exciting current detecting resistor connected in series with an excitation coil through which an exciting current flows between center terminals of the power supply section and the control elements, a reference signal generator for delivering a square-wave voltage signal varying with a given period and equal amplitudes on both positive and negative sides, and an operational amplifier supplied with the square-wave voltage signal and a voltage drop caused at the detecting resistor by the exciting current to produce an output signal for controlling the control elements, thereby causing an exciting current corresponding to the square-wave voltage signal in period, amplitude and polarity to flow through the excitation coil.

8 Claims, 7 Drawing Figures

SQUARE-WAVE CURRENT GENERATOR

BACKGROUND OF THE INVENTION

This invention relates to a square-wave current generator for supplying an excitation coil for producing a magnetic field with a fixed exciting current that periodically reverses its direction, and more specifically to a square-wave current generator adapted for use with an electromagnetic flow meter employing a square-wave excitation system.

Conventionally known are electromagnetic flow meters which use a square-wave excitation system. In one such prior art electromagnetic flow meter, a magnetic field of a fixed magnitude, changing its polarity with a given period, is applied substantially at right angles to the flow direction of a conductive fluid, a voltage produced in the fluid is detected by means of a pair of electrodes, and the flow rate of the fluid is measured on the basis of the detection value thus obtained. In the electromagnetic flow meter of this type, the direction of the magnetic field and hence the detected voltage is periodically reversed, so that the detected voltage value is less liable to electrochemical noise attributed to unidirectional interaction between the electrodes and the fluid. Moreover, noise produced by the change of interlinkage between an electric circuit formed of the electrodes and the fluid and magnetic flux forming the magnetic field can be reduced by measuring the exciting current while its amplitude is substantially fixed because the exciting current is a square-wave current. Furthermore, noise attributable to stray capacitance in the wires and the excitation coil interlinked to the electrodes can be lowered. Owing to these advantages, the electromagnetic flow meter is capable of stable flow rate measurement.

The prior art square-wave current generator with these advantages is generally constructed as follows. A DC power supply is connected through a constant-current circuit to the input terminals of four switching transistors which constitute a bridge circuit. Connected to the output terminals of the transistors is an excitation coil through which an exciting current in the form of a symmetrical square wave flows. Positive and negative voltage outputs from the symmetrical square-wave current generator are applied alternately to the two opposite pairs of transistors in the bridge circuit, and an exciting current reversing with a given period and having equal positive and negative amplitudes flows through the excitation coil. Connected between the DC power supply and the bridge circuit are a resistor for exciting current detection and a transistor for constant-current control to keep the exciting current at a predetermined value. Current flowing through the constant-current control transistor is controlled by the output of an operational amplifier. The input of the operational amplifier is applied to a DC reference voltage signal delivered from a reference signal generator and a voltage drop caused by the current flowing through the detecting resistor, and the amplifier supplies the constant-current control transistor with a base current equivalent to the difference between the two inputs. Actuated by the base current, the constant-current control transistor adjusts the exciting current so that the two inputs applied to the operational amplifier are equalized. Thus, the direction and amplitude of the exciting current are made to correspond to the reference voltage signal and the voltage signal from the symmetrical square-wave current generator.

In the square-wave current generator of the aforementioned construction, a constant current can be made to flow in two directions by the use of a single power supply. However, this generator still is subject to the following drawbacks. The base currents of those two transistors among the four transistors of the bridge circuit which are on the side of the detecting resistor and the constant-current control transistor flow not through the excitation coil but through the detecting resistor. Accordingly, there will be an error or a discrepancy between the amplitudes of the exciting current and the reference voltage signal. Also, leakage currents at the four transistors forming the bridge circuit will cause errors. Among these errors, the error attributable to the base currents can be removed by the use of MOSFETs. The presently available FETs, however, require an additional power supply, as well as the DC power supply, to obtain positive and negative exciting currents. Moreover, the prior art generator requires a substantial number of transistors including the four transistors used in the bridge circuit and the constant-current control transistor. The four transistors of the bridge circuit must be of a high-power type for the switching of the exciting current. Since the exciting current in operation continually flows through the two of the four transistors of the bridge circuit and the constant-current control transistor, a lot of electric power is consumed by these three transistors. This makes the transistors, and therefore the whole circuit, less reliable.

SUMMARY OF THE INVENTION

The object of this invention is to provide a square-wave current generator formed of fewer control elements than those of the prior art generator, and including a circuit so designed that the value of an exciting current flowing through an excitation coil is equal to that of a current flowing through a current detecting element or resistor.

In order to attain the above object, a square-wave current generator of this invention comprises a power supply section for supplying an exciting current, the power supply section including a first center terminal, control element means connected in series across the power supply section, the control element means including a second center terminal in the center of the series connection, a current detecting element connected in series with an excitation coil between the two center terminals to deliver a voltage corresponding to the exciting current, a reference signal generator alternately delivering positive and negative square-wave voltage signals of the same amplitude with a given period, and an amplifying section supplied with the output signal from the current detecting element and the square-wave voltage signal from the reference signal generator to alternately apply on and off signals to the control element means on both sides of the second center terminal, thereby causing an exciting current corresponding to the square-wave voltage signal in period, amplitude and polarity to flow through the excitation coil.

The square-wave current generator of this invention has the following various advantages over the prior art square-wave current generator. The control element means used in the invention are limited to those which are connected in series across the power supply section, and can perform both exciting current switching and constant-current control. Unlike the prior art generator, the square-wave signal generator of the invention requires neither a bridge circuit for exciting current switching nor any additional control element means for the constant-current control. In the generator of the invention, moreover, all the exciting currents flowing through the excitation coil can be made to flow through the exciting current detecting element, so that the exciting current can be measured with high accuracy. Thus, the constant-current control of the exciting current and the maintenance of a fixed amplitude of a magnetic field formed by the exciting current can be achieved accurately. The use of fewer control element means leads to a reduction in power consumption by the control element means. Thus, the square-wave current generator of the invention has a reduced temperature rise for greater energy economy.

In a preferred embodiment of this invention, a voltage doubler rectifier circuit connected to an AC power supply is used as an exciting current source for the square-wave current generator. In this case, current is made to flow in one direction by means of one of two circuits forming the voltage doubler rectifier circuit and alternately performing a rectifying operation, and to flow in the other direction by means of the other circuit. In reversing the flowing direction of the exciting current, according to such an arrangement, a capacitor in the rectifier circuit through which no exciting current has so far been flowing can previously be charged to the peak voltage of the AC power supply so that electric charges stored in the capacitor may be applied to the excitation coil in the initial stage of the inversion of the exciting current. Thus, the time required for the rise of the exciting current may greatly be reduced, so that the exciting current can rapidly attain a predetermined square-wave amplitude after inversion. In the square wave current generator of this invention, the current flowing through the individual control elements is controlled by the detecting means of the operational amplifier detecting the difference between the value of a voltage drop at the exciting current detecting resistor and a reference voltage generated by the reference signal generator, and then changing the base currents of the control elements by means of the difference between the voltages. Even if the voltage difference is very small, therefore, the control elements start operation at once, and control the currents flowing through the coil with high sensitivity so that the current corresponds to the reference voltage signal.

DETAILED DESCRIPTION OF THE PREFERRED EMBODIMENTS

Figure 1:
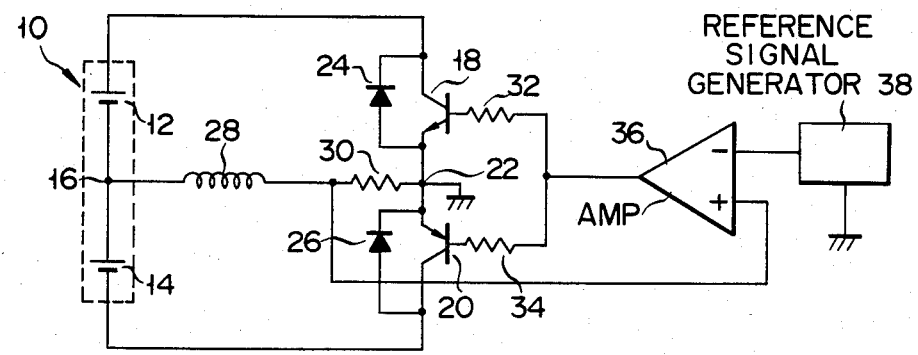
FIG. 1 is a circuit diagram of an embodiment of the square-wave current generator of this invention.

FIG. 1 is a circuit diagram of a basic embodiment of the square-wave current generator of this invention. A power supply section 10 includes two series-connected DC power supplies 12 and 14 of the same capacity. A center terminal 16 is provided at the junction of the power supplies 12 and 14. The collectors of an npn transistor 18 and a pnp transistor 20 as a pair of control element means are connected to positive and negative ends of the power supply section 10, respectively. The emitters of the transistors 18 and 20 are both grounded through a center terminal 22. Diodes 24 and 26 for transistor protection are connected in parallel with the transistors 18 and 20, respectively. Connected between the center terminals 16 and 22 are an excitation coil 28 for forming a prescribed magnetic field and a current detecting element or a detecting resistor 30 for detecting the value of an exciting current flowing through the excitation coil 28. The bases of the transistors 18 and 20 are connected to the output terminal of an operational amplifier 36 through resistors 32 and 34, respectively. The noninverting input terminal of the operational amplifier 36 is connected with the junction of the excitation coil 28 and the detecting resistor 30, while the inverting input terminal is connected with a reference signal generator 38 for delivering a symmetrical square-wave voltage signal or a reference voltage signal which varies with a given period and a given amplitude. N- and p-channel enhancement-type MOSFETs may be used for the transistors 18 and 20, respectively.

Figure 2:
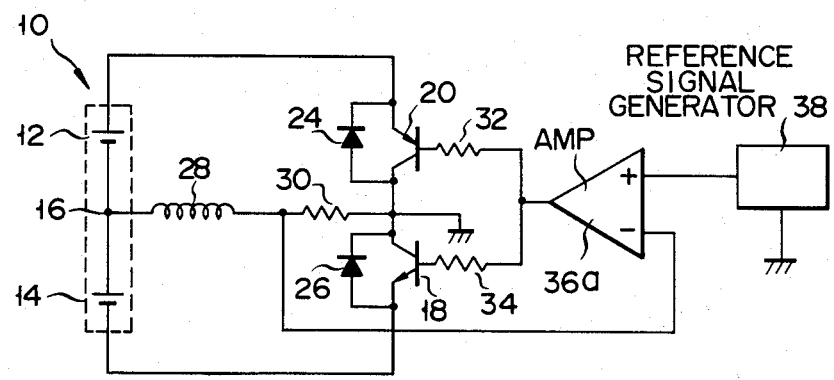
FIG. 2 is a circuit diagram of another embodiment of the invention.

FIG. 2 shows another embodiment of the invention, which differs from the embodiment of FIG. 1 in that the npn and pnp transistors 18 and 20 are replaced with each other in the circuit of FIG. 1, that the junction of the excitation coil 28 and the detecting resistor 30 is connected to the inverting input terminal of an amplifying section or an operational amplifier 36a, and that the output of the signal generator 38 is connected to the noninverting input terminal of the operational amplifier 36a. Also in this case, p- and n-channel enhancement-type MOSFETs may be used in place of the pnp and npn transistors 20 and 18, respectively.

Figure 3:
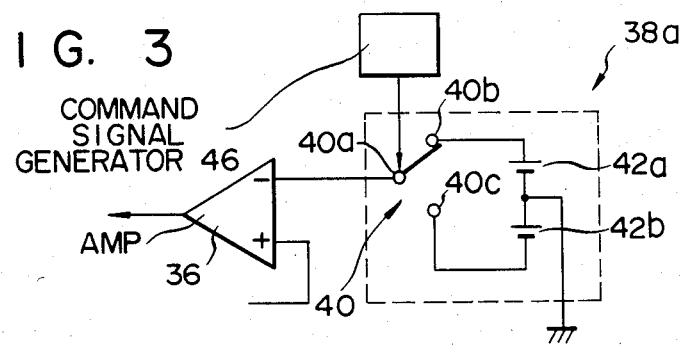
FIGS. 3 to 5 are circuit diagrams of three embodiments of the reference signal generator used in the square-wave current generator of the invention.
Figure 4:
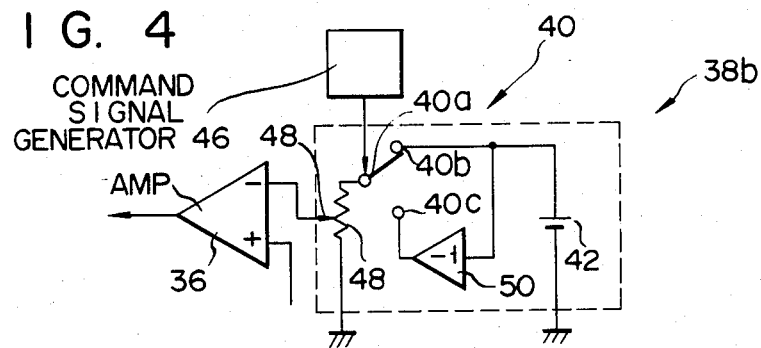
Figure 5:
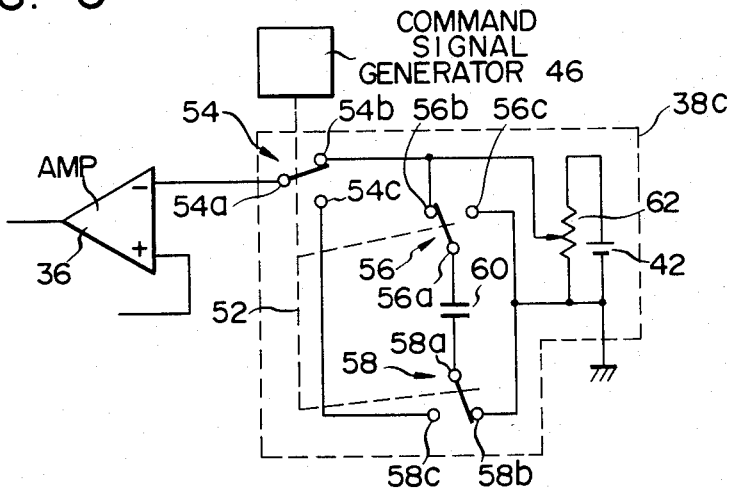

FIGS. 3 to 5 show various embodiments of the reference signal generator 38. A first reference signal generator 38a shown in FIG. 3 comprises a change-over switch 40 and two series-connected voltage references 42a and 42b of the same capacity. The junction of the references 42a and 42b is grounded. The change-over switch 40 has an output terminal 40a and input terminals 40b and 40c, which are connected to the inverting input terminal of the operational amplifier 36a, the positive voltage terminal of the reference 42a, and the negative voltage terminal of the reference 42b, respectively. The change-over switch 40 operates in response to a command signal delivered from a command signal generator 46 with a given period, and the output terminal 40a is shifted alternately between the input terminals 40b and 40c with the given period. Thus, a reference voltage signal or a symmetrical square-wave voltage signal varying with the given period is supplied from the output terminal 40a to the inverted input side of the operational amplifier 36a.

In a second reference signal generator 38b shown in FIG. 4, the input terminal 40b of the change-over switch 40 is connected to the input terminal 40c through an inverter circuit 50, and also to the positive voltage terminal of a single voltage reference 42. The output terminal 40a is connected to potentiometer 48 one end of which is grounded. A slider lead 48a of the potentiometer 48 is connected to the inverting input terminal of the operational amplifier 36. The input terminal 40b is at a positive potential compared with the ground potential, while the input terminal 40c is at a negative potential. When the change-over switch 40 operates in response to the command signal from the command signal generator 46, therefore, the inverting input terminal of the operational amplifier 36 is supplied with the same reference voltage signal as the one supplied in the embodiment of FIG. 3. The potentiometer 48 is intended to adjust the amplitude of the reference voltage signal supplied to the operational amplifier 36, therey controlling the amplitude of the exciting current to flow through the coil 28.

A third reference signal generator 38c shown in FIG. 5 comprises a change-over switch 52 consisting of three switching sections 54, 56 and 58, a capacitor 60, the reference 42, and a potentiometer 62. The switching section 54 is provided with an output terminal 54a and input terminals 54b and 54c; the switching section 56 with first, second and third contacts 56a, 56b and 56c, and the switching section 58 with first, second and third contacts 58a, 58b and 58c. The output terminal 54a of the switching section 54 is connected to the inverting input terminal of the operational amplifier 36, and the input terminal 54b is connected to the second contact 56b of the switching section 56 and the slider lead of the potentiometer 62. The input terminal 54c of the switching section 54 is connected to the third contact 58c of the switching section 58. The respective first contacts 56a and 58a of the switching sections 56 and 58 are connected individually to both ends of the capacitor 60. The third contact 56c of the switching section 56 and the second contact 58b of the switching section 58 are grounded. The negative voltage terminal of the voltage reference 42 and one end of the resistor of the potentiometer 62 are grounded, while the positive voltage terminal of the reference 42 and the other end of the resistor of the potentiometer 62 are connected. The switching sections 54, 56 and 58 are shifted between the following first and second modes in response to the command signal from the command signal generator 46.

In the first mode, the output and input terminals 54a and 54b are connected at the switching section 54, the first and second contacts 56a and 56b are connected at the switching section 56, and the first and second contacts 58a and 58b are connected at the switching section 58. In this first mode, therefore, the positive output voltage side of the potentiometer 62 is connected to the inverting input terminal of the operational amplifier 36 through the slider lead and the input and output terminals 54b and 54a of the switching section 54, and to one terminal of the capacitor 60 via the second and first contacts 56b and 56a of the switching section 56. The other terminal of the capacitor 60 is grounded through the first and second contacts 58a and 58b of the switching section 58. In the second mode, the terminals 54a and 54c, the contacts 56a and 56c, and the contacts 58a and 58c are connected to one another. In contrast with the case of the first mode, therefore, the negative voltage side of the capacitor 60 is connected to the inverting input terminal of the operational amplifier 36. Since the change-over switch 52 including the switching sections 54, 56 and 58 is shifted with a given period in response to the command signal delivered from the command signal generator 46, voltages of the same absolute value and difference in polarity are applied alternately between the inverting input terminal of the operational amplifier 36 and the ground. While the reference signal generator 38a requires two voltage references 42a and 42b, the signal generators 38b and 38c of FIG. 4 and 5 require only the single voltage reference 42.

The change-over switches 40 and 52 used in the signal generators 38a, 38b and 38c of FIGS. 3, 4 and 5 may be semiconductor switches, mechanical switches, or other suitable conventional switches.

There will now be described the operation of the embodiment of FIG. 1. In this case, the reference signal generator 38a of FIG. 3 is supposed to be used for the reference signal generator. When the symmetrical square-wave voltage signal is supplied from the change-over switch 40 to the inverted input terminal of the operational amplifier 36 after the output and input terminals 40a and 40b are connected in response to the command signal from the command signal generator 46, the operational amplifier 36 delivers the reference voltage signal in an inverted manner. Thus, the transistor 18 is reverse-biased and turned off, while the transistor 20 is forward-biased and turned on. Accordingly, current flows from the positive voltage terminal of the DC power supply 14 toward the negative voltage terminal thereof through the excitation coil 28, the detecting resistor 30, and the transistor 20. At this time, a voltage drop caused at the detecting resistor 30 and an output voltage delivered from the reference signal generator 38 are made equal by the agency of the operational amplifier 36. Accordingly, the exciting current flowing through the excitation coil 28 takes a fixed current value which corresponds to the amplitude of the voltage signal delivered from the reference signal generator 38.

Subsequently, when the output and input terminals 40a and 40c are connected in response to the operation of the change-over switch 40 of FIG. 3, a positive voltage signal is delivered from the operational amplifier 36. Thus, the transistor 20 is reverse-biased, while the transistor 18 is forward-biased. Accordingly, current flows from the positive voltage terminal of the DC power supply 12 toward the negative voltage terminal thereof through the transistor 18, the detecting resistor 30, and the excitation coil 28. The direction of this current is opposite to the current direction before the shifting of the change-over switch 40. At this time, a negative voltage signal (negative as compared with the ground potential) from the reference signal generator 38 is applied to the inverting input terminal of the operational amplifier 36, while a voltage drop (negative as compared with the ground potential) at the detecting resistor 30 is supplied to the noninverting input terminal. As a result, the exciting current flowing through the excitation coil 28 has the same magnitude as that of the exciting current obtained before the shifting of the change-over switch 40. As is evident from the above description, the magnetic field produced by the current flowing through the excitation coil 28 reverses its direction with the same period as the reference voltage signal delivered from the reference signal generator 38, and the inverted magnetic field has the same magnitude as before.

It is to be understood that the signal generators 38b and 38c of FIGS. 4 and 5 may be used in place of the signal generator 38a of FIG. 3.

In the second embodiment of the square-wave current generator shown in FIG. 2, the transistors have opposite polarities, so that the related members vary in polarity. The operation of this embodiment will not be explained, since it may easily be understood from the foregoing description of the embodiment of FIG. 1.

In the square-wave current generators of FIGS. 1 and 2, the currents to flow through the excitation coil 28 and the detecting resistor 30 may be considered substantially equivalent. Accordingly, the amplitudes of the exciting current and the reference voltage signal may be equalized with high accuracy by controlling the current to flow through the transistors 18 and 20 so that the difference between the voltage drop caused at the resistor 30 and the amplitude of the reference voltage signal compared by means of the operational amplifier 36 is zero.

The control elements or transistors used in the embodiments of FIGS. 1 and 2 are fewer than those used in the prior art square-wave current generator. This advantage of the generator of the invention is attributed to the following fact. The prior art square-wave current generator uses four switching transistors in a bridge circuit for switching the direction of the exciting current and another transistor for constant-current control of the exciting current. The square-wave current generators of FIGS. 1 and 2, on the other hand, are provided with an electric circuit using two transistors 18 and 20 to perform both the switching and constant-current controlling operations.

Also, the reduced number of transistors used and the circuit arrangement in which fewer transistors operate at the same time leads to a substantial reduction in power consumption. Thus, the square-wave current generator of the invention is restricted in temperature rise and saves energy. In the prior art generator, two out of the four transistors forming the bridge circuit plus the one for the constant-current control operate continually. In the generator of the invention, however, the transistors 18 and 20 operate alternately and never at the same time.

Figure 6:
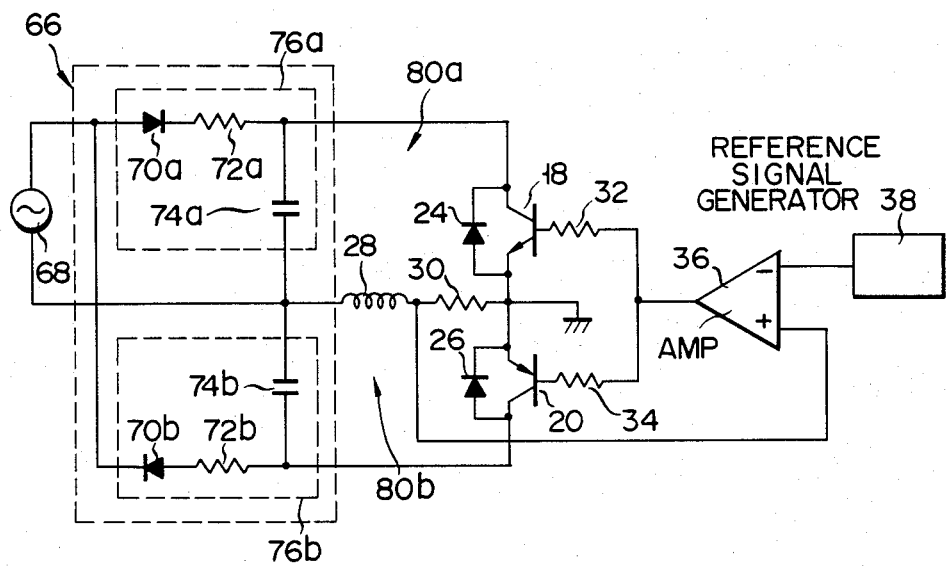
FIGS. 6 and 7 are circuit diagrams showing further embodiments.

FIG. 6 shows a third embodiment of the square-wave current generator of this invention. This embodiment differs from the embodiment of FIG. 1 in that a voltage doubler rectifier circuit 66 is used in place of the power supply section 10 of FIG. 1. In FIG. 6, numeral 68 designates an AC power supply; 70a and 70b, rectifying elements; 72a and 72b, resistors for smoothing; 74a and 74b, capacitors for smoothing. A circuit including the members 70a, 72a and 74a and enclosed with a broken line is referred to as a first rectifier-smoothing circuit 76a. Likewise, a circuit including the members 70b, 72b and 74b and enclosed with another broken line is referred to as a second rectifier-smoothing circuit 76b. The construction and operation of other portions are the same as those of the corresponding portions in the embodiment of FIG. 1. As described in conjunction with the embodiment of FIG. 1, when a positive voltage output is delivered from the operational amplifier 36 to turn the transistors 18 and 20 on and off, respectively, an exciting current flows from right to left of FIG. 6 through the excitation coil 28 after flowing through the upper-side terminal of the AC power supply 68, the first rectifier-smoothing circuit 76a, the transistor 18, and the detecting resistor 30 in a first excitation circuit 80a. Thus, the current flowing through the excitation coil 28 does not flow through a second excitation circuit 80b. In the second excitation circuit 80b, the capacitor 74 is charged to the peak voltage Vp of the AC power supply 68, that is, $\sqrt{2}$ times the effective voltage, by the agency of the second rectifier-smoothing circuit 76b. In this case, the upper side of the capacitor 74b is at high potential, while the lower side is at low potential. Due to a voltage drop at the resistor 72a, the voltage applied to the capacitor 74a of the first rectifier-smoothing circuit 76a is lowered. When the output from the operational amplifier 36 is converted to a negative voltage after the passage of a given time, the transistors 18 and 20 are turned off and on, respectively. Thereupon, the supply of the exciting current by the first excitation circuit 80a is stopped, and a great transient current is made to flow from left to right through the excitation coil 28 by the capacitor 74b of the second excitation circuit 80b which is previously charged to the peak voltage Vp of the AC power supply 68. Also, a current from the lower-side terminal of the AC power supply 68 flows from left to right through the excitation coil 28, the detecting resistor 30, the transistor 20, and the second rectifier-smoothing circuit 76b. In the meantime, the capacitor 74a starts to be changed to the peak voltage Vp, and the voltage of the capacitor 74b is lowered. Such inversion of the exciting current is achieved immediately after the polarity change of the reference voltage signal delivered from the reference signal generator 38. Although the polarity of the magnetic field formed by the excitation coil 28 is reversed with a given period, the amplitude of the magnetic field is invariable.

The embodiment of FIG. 6 provides such an effect that the rise time of the exciting current, that is, the time for the exciting current to settle at a prescribed value when it is inverted, is substantially shortened and the power consumption is reduced by the transistors 18 and 20. This is attributable to the following circumstances. When the transistors 18 and 20 are turned off and on, respectively, the supply of the exciting current by the first excitation circuit 80a is stopped, and the exciting current produced by the second excitation current 80b starts to flow in the opposite direction. At the same time, electric charges stored in the capacitor 74b which is previously charged to the peak voltage are discharged as a great current in the same direction as the current produced by the second excitation circuit 80b. The period of the polarity conversion of the reference voltage signal applied to the bases of the transistors 18 and 20 is normally longer than the cycle of the AC power supply 68, e.g., four to sixteen times as long as the power supply cycle in an electromagnetic flow meter. Accordingly, the capacitor 74b is charged to the peak voltage Vp with sufficient time to spare before the transistor 20 is turned on. This holds true without regard to the direction of the exciting current. Since the rise time of the exciting current is very short, as mentioned before, the magnetic field changed by the inversion of the exciting current rapidly attains a predetermined magnitude with a short transient time. Accordingly, measurement of flow rate can be performed stably by means of a device using the inverted magnetic field, e.g., an electromagnetic flow meter. According to the embodiment of FIG. 6, a conventional commercial power supply can be used for the AC power supply 68, so that it is unnecessary to use the DC power supply section 10 shown in FIGS. 1 and 2. If a transformer is connected to the commerical power supply, the wire-wound resistor of the transformer may be used directly in place of the resistors 72a and 72b in the rectifier-smoothing circuits 76a and 76b. Alternatively, the operating resistors of the rectifying elements 70a and 70b may be used for this purpose. In other words, the resistors 72a and 72b are not essential.

Figure 7:
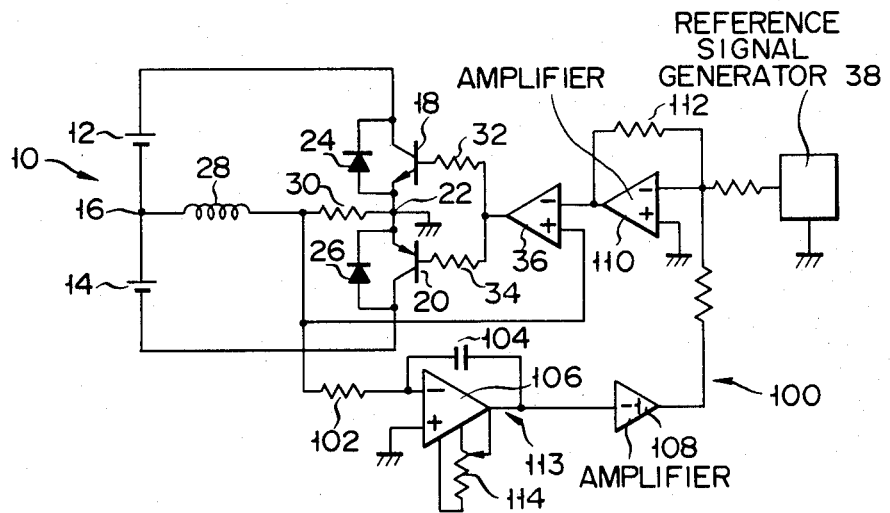

In an embodiment shown in FIG. 7, an automatic compensating circuit 100 is connected between the operational amplifier 36 and the reference signal generator 38 of the embodiment shown in FIG. 1. This circuit 100 can prevent inequality of the positive and negative amplitudes of the reference voltage signal delivered from the reference signal generator 38 and variations of the value of the exciting current with the change of the flowing direction due to the offset of the operational amplifier 36 and the like. In the automatic compensating circuit 100, a voltage drop caused at the detecting resistor 30 is integrated by an integration circuit 113 formed of a resistor 102, a capacitor 104, and an operational amplifier 106, and is passed through an inverter circuit 108. The respective outputs of the inverter circuit 108 and the reference signal generator 38 are mixed and applied to the inverting input terminal of an operational amplifier 110. The output of the amplifier 110 is supplied to the inverting input terminal of the operational amplifier 36. The inverting input terminal and the output terminal of the operational amplifier 110 are connected through a resistor 112, and the noninverting terminal is grounded. The time constant of a combination of the resistor 102 and the capacitor 104 with respect to the integration circuit 113 is greater than the period of inversion of the exciting current. A variable resistor 114 attached to the operational 10 amplifier 106 is used for compensating the offset of the operational amplifier 106.

In the square-wave current generator of the embodiment shown in FIG. 7, if the value of the exciting current varies with the flowing direction from any cause so that the exciting current flowing from right to left of FIG. 7 is increased and that the exciting current flowing in the opposite direction is decreased, the voltage applied to the inverted input terminal of the operational amplifier 106 becomes a negative voltage when the current flows from right to left. When the current flows from left to right, the voltage becomes a positive voltage with an amplitude smaller than that of the negative voltage. Thus, a positive voltage is delivered from the integration circuit 113, and is converted to a negative voltage by the inverter circuit 108. The negative voltage, along with the reference voltage signal from the reference signal generator 38, is supplied to the inverted input terminal of the operational amplifier 110. As a result, the output of the operational amplifier 110 is biased to the positive-potential side, while the output of the operational amplifier 36 is biased to the negative-potential side. Accordingly, the exciting current flowing from right to left through the excitation coil after flowing through the transistor 18 is reduced, while the current flowing from left to right through the excitation coil 28 after flowing through the transistor 20 is increased. This action continues until the exciting current becomes substantially constant without regard to the flowing direction. The use of the automatic compensating circuit 100 obviates the necessity that the reference voltage signal delivered from the reference signal generator 38 be an exactly symmetrical square-wave signal. If an offset is caused at the operational amplifier used, it will be compensated by the automatic compensating circuit 100, and the excitation coil 28 can form a magnetic field corresponding to the reference voltage signal.

In FIGS. 1, 2, 6 and 7, the transistors 18 and 20 are shown as a single pair of control elements. Depending on the magnitudes of the supply voltage and exciting current, however, the transistors 18 and 20 may be replaced with a greater number of series-, parallel-, or series-parallel-connected transistors.

A unidirectional magnetic field may be produced for the purpose of, e.g., testing an electromagnetic flow meter by only disconnecting the resistors 30 and 34 in the circuit of FIG. 7 by means of a switch (not shown). If a capacitor 35 subject to small leakage current with small input bias is used, the operational amplifier 106 holds the integration voltage immediately before current interruption, so that the exciting current can substantially be prevented from decreasing during the testing of the electromagnetic flow meter.

What is claimed is:

1. A square-wave current generator which supplies an excitation coil for producing a magnetic field with an exciting current periodically reversing its flowing direction comprising:
    a power supply section for supplying the exciting current, said power supply section including a first center terminal;
    control element means connected in series across said power supply section, said control element means including a second center terminal in the center of the series connection;
    a current detecting element connected in series with said excitation coil between said two center terminals to deliver a voltage output signal corresponding to the exciting current;
    a reference signal generator alternately delivering positive and negative square-wave voltage signals of the same amplitude with a given period; and
    an amplifying section supplied with the output signal from said current detecting element and the square-wave voltage signals from said reference signal generator to alternately apply on and off signals to said control element means on both sides of said second center terminal, thereby causing an exciting current corresponding to the square-wave voltage signal in period, amplitude and polarity to flow through said excitation coil.

2. The square-wave current generator according to claim 1, wherein said power supply section consists of two series-connected DC power supplies.

3. The square-wave current generator according to claim 1, wherein said power supply section is a voltage doubler rectifier circuit driven by an AC power supply.

4. The square-wave current generator according to claim 1, wherein said reference signal generator includes two series-connected voltage references and a change-over switch alternately shifting between the positive and negative voltage terminals of said two series-connected voltage references.

5. The square-wave current generator according to claim 1, wherein said reference signal generator includes a single voltage reference, an inverter circuit connected to one electrode of said voltage reference, and a change-over switch shifting between said one electrode and the output terminal of said inverter circuit.

6. The square-wave current generator according to claim 1, wherein said amplifying section includes an operational amplifier and said reference signal generator includes a single voltage reference, a capacitor, and a triple double-throw switch, so that, when said switch is in one switching position, said capacitor is charged with the output voltage of said voltage reference, and the high-potential side of said voltage reference is connected to the inverting input terminal of said operational amplifier, and that, when said switch is in the other switching position, the high-potential side of said voltage reference is disconnected from other circuits, and the low-potential side of said charged capacitor is connected to the inverting input terminal of said operational amplifier.

7. The square-wave current generator according to claim 6, wherein said power supply section is a voltage doubler rectifier circuit connected to an AC power supply.

8. The square-wave current generator according to claim 7, further comprising automatic compensating means including an integration circuit for integrating the output of said current detecting element, and means for supplying said amplifying section with the output of said reference signal generator biased by means of the output of said integration circuit, whereby said control element means are driven so that the output of said integration circuit is zero.

* * * * *